United States Patent [19]

Jones et al.

[11] Patent Number: 4,660,866
[45] Date of Patent: Apr. 28, 1987

[54] RESTRAINED PIPE JOINT

[75] Inventors: Lawrence S. Jones, Hueytown; Billy J. Battle, Birmingham, both of Ala.

[73] Assignee: United States Pipe and Foundry Company, Birmingham, Ala.

[21] Appl. No.: 861,816

[22] Filed: May 12, 1986

[51] Int. Cl.⁴ .............................................. F16L 21/02
[52] U.S. Cl. .................................. 285/231; 285/374; 285/403
[58] Field of Search ............... 285/184, 321, 374, 230, 285/231, 403, 286

[56] References Cited

U.S. PATENT DOCUMENTS

| | | |
|---|---|---|
| 763,542 | 6/1904 | Crawford et al. |
| 1,072,736 | 9/1913 | Kelly |
| 1,474,435 | 11/1923 | McWane |
| 1,474,437 | 11/1923 | McWane |
| 1,588,444 | 6/1926 | Carson |
| 3,239,244 | 3/1966 | Leinfelt ................................. 285/7 |
| 3,433,509 | 3/1969 | Jeffery et al. ...................... 285/374 |
| 3,480,302 | 11/1969 | Jeffery et al. ...................... 285/362 |
| 3,684,320 | 8/1972 | Platzer ................................. 285/81 |
| 4,540,204 | 9/1985 | Battle et al. ....................... 285/231 |

Primary Examiner—Dave W. Arola
Attorney, Agent, or Firm—James W. Grace; Charles W. Vanecek

[57] ABSTRACT

The invention concerns pipe joints in which an improved locking segment has an outwardly extending protrusion which is adapted to abut a circumferential wall in the bell end of a pipe which telescopically receives a second pipe.

5 Claims, 4 Drawing Figures

U.S. Patent  Apr. 28, 1987  4,660,866

RESTRAINED PIPE JOINT

BACKGROUND OF THE INVENTION

1. Field of the Invention

The invention is in the field of joined cast ductile iron pipe. More specifically, it is in the field of joining ductile iron pipe in such a manner that they will not separate when subjected to axial loads as well as other loads associated with buried pipe lines.

2. Description of the Prior art

It is common practice to make pipe joints wherein one pipe having a spigot or plain end is pushed into the bell end of another pipe. To prevent leakage a soft rubber ring with a hard rubber insert on one side is placed into the bell of the outside pipe, prior to the insertion of the plain end.

To prevent the pipes from separating under pressure such joints have been modified by using radially extending locking segments inserted in the bell of a first pipe and engaging a circumferential weldment on the outside of a second pipe telescoped inside the first pipe.

Such a method is described in U.S. Pat. No. 4,540,204. This patent represents the most recent prior art known to the inventors. However, when applying the prior art method to very large pipe, e.g., those 42 inches and larger, the method exhibits a need for improvement. Such need is most apparent in a deflected joint when a pipe with a bell opening having the maximum tolerance permitted is joined with a pipe having a plain end whose diameter is the minimum permitted. In such cases, the locking segment can become misaligned with the barrel of the inner pipe. This misalignment of the locking segments in a pressurized pipe line can allow the weldment on the inner pipe to move under the locking segment either partially or completely. In the first instance, preventing disassembly while in the second and more important, allowing the two pipe to become disengaged, i.e., failure of the joint. While failure of the prior art joint at normal working pressures should not be anticipated, it is possible to achieve higher working pressures with the improved locking segment of the present invention.

SUMMARY OF THE INVENTION

The invention comprises a novel improvement to the locking segment of the prior art patent mentioned above. A protrusion from one portion of each locking segment abuts against a preselected wall portion of the bell cavity of the outer pipe. This abutting arrangement of the protrusion on the locking segment and the wall portion of the outer pipe limits the amount of misalignment that the locking segment can undergo.

OBJECTS OF THE INVENTION

It is an object of the present invention to provide a novel pipe joint structure which is capable of withstanding great fluid pressures without failure.

It is another object of the invention to provide a novel pipe joint structure which is an improvement over the prior art and yet can be easily manufactured without a great departure from accepted pipe manufacturing practice.

It is yet another object of this invention to provide a novel pipe joint structure which has an added feature that acts when the fluid pressure and/or deflection in the joint exceeds a given amount to provide a supplementary stabilizing feature.

BRIEF DESCRIPTION OF THE DRAWING

Other objects and advantages of the present invention will become apparent to those skilled in the art from the following detailed description of the invention taken in conjunction with the accompanying drawing in which like elements are represented by like numerals and in which.

DESCRIPTION OF THE PREFERRED EMBODIMENT

Figure 1:
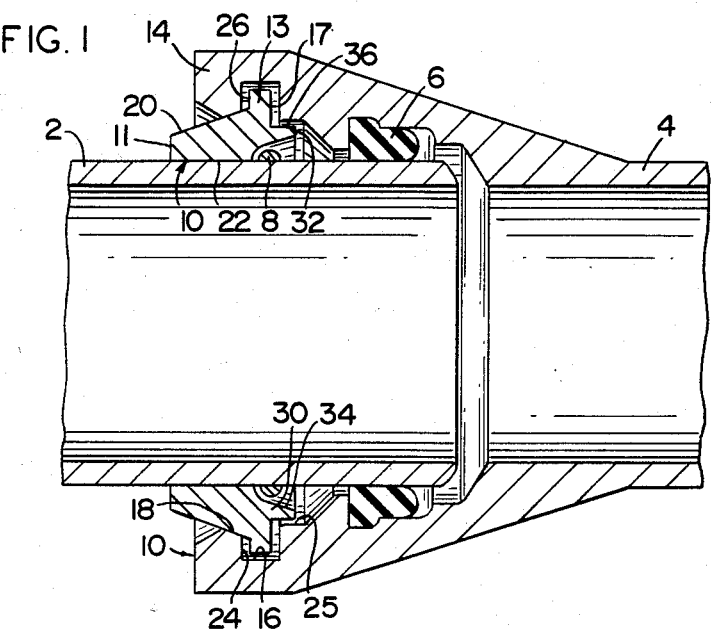
FIG. 1 is a fragmented cross-sectional view of the pipe joint of the invention.

Referring to FIG. 1 of the drawing, there is shown pipe 2 joined to pipe 4 in accordance with the invention. Each of pipes 2 and 4 is preferably a ductile pipe made by a centrifugal process, well known in the art, although the invention is not to be limited by the nature of the material of which the pipe is made. The joint between pipes 2 and 4 is sealed by rubber gasket 6 which is compressed between the plain end of pipe 2 and the bell sealing surfaces of pipe 4. A typical joint of this type is illustrated in U.S. Pat. No. 2,953,398, patented Sept. 20, 1960.

In order to provide a locking action to prevent pipes 2 and 4 from separating axially a combination of a weldment 8, locking elements 10 and a projection 14 are provided. Projection 14 is integrally cast with the end of the bell of pipe 4 and the depending portion of projection 14 is separated from the major remaining portion of the bell by a groove 16. The lower surface 18 of projection 14 facing toward the interior of the bell of pipe 4 is slanted so that it is in the plane of an acute angle with respect to the longitudinal surface of plane pipe 2. Generally, the lower surface 18 may be considered to be a section of a cone whose apex would be outside the bell of pipe 4. However, surface 18 could be a portion of a sphere whose center would be inside the bell of pipe 4. Surface 20 of locking element 10 will have a similar and complementary shape to that of surface 18 of projection 14. Projection 14 at groove 16 has a surface 24 which is perpendicular to the axis of pipe 4. Cylindrical bell wall 25 extends circumferentially adjacent groove 16. As will be discussed in greater detail hereinafter, surfaces 18, 24 and 25 are arranged to contact mating surfaces of locking segments 10.

Figure 2:
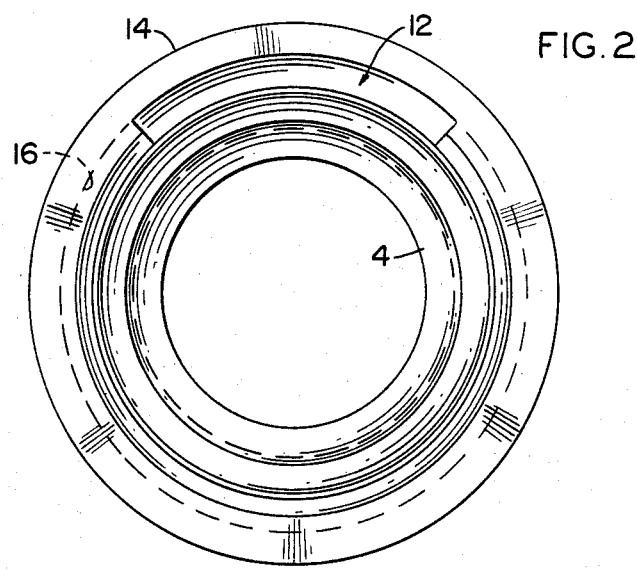
FIG. 2 is an end elevational view of the bell of a pipe according to the invention.

FIG. 2 shows an elevation view of the outer face of the bell end and more particularly projection 14 and groove 16, (shown in dotted lines). A recess 12 is cut into projection 14 to permit locking segments 10 to be inserted into groove 16. Recess 12 is longer than a locking segment 10 so that locking segment 10 can be inserted into groove 16 through recess 12.

Figure 3:
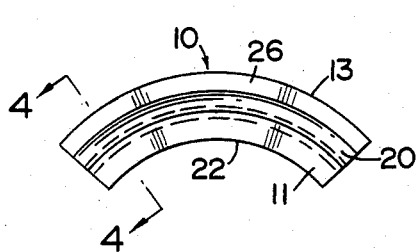
FIG. 3 is a side view of a locking segment according to the invention.
Figure 4:
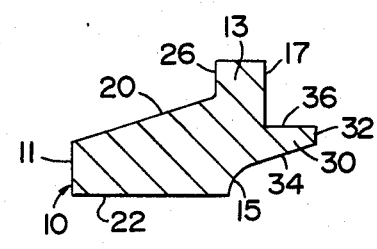
FIG. 4 is a cross-sectional view of a locking element taken along line 4—4 of FIG. 3.

Locking segments 10 are shown better in FIGS. 3 and 4. In FIG. 3 the locking segment 10 is shown as an arcuate piece, preferably of ductile iron whose shape corresponds to the outer circumference of plain pipe 2. As shown in FIG. 3, locking element 10 has an under face 22 which is actually an arc corresponding to the outer circumference of plain pipe 2. Locking segment 10 further has a front leg portion 11 and a body portion 13. Face 26 is one side of body portion 13, while face 17 constitutes the other side of body portion 13. Slant face 20 connects front leg portion 11 to a face 26 which is perpendicular to the front face of leg portion 11 and rises to meet the top flat part of body portion 3. It should be noted that face 20 is designed to have the same slope as lower surface 18 or slightly less slope as surface 18 of projection 14 and when properly installed surface 18 and face 20 will abut and complement each other. In the case where surface 20 has slightly less slope than surface 18, the two surfaces complement each other only after the slope of surface 18 has been decreased due to the wedging action caused by an axial force tending to separate the two pipe. At its lower right-hand edge, locking segment 10 has an arcuate portion 15 which is designed to accommodate and mate with weldment 8, and extends in the direction opposite leg potion 11.

As is more readily seen in FIG. 4, a protrusion 30, integral with face 17 of locking element 10 extends away from face 17 in the direction opposite leg portion 11. Protrusion 30 has an end face 32 which is joined to arcuate portion 15 by an extension 34 of arcuate portion 15. Protrusion 30 has an upper surface 36 forming a shelf which connects end face 32 to face 17 of locking element 10. Shelf face 36 of protrusion 30 is located about midway of face 17.

As can be seen in FIG. 1, body portion 13 of locking segment 10 extends into groove 16 of the bell of pipe 4 but when initially inserted face 26 is slightly spaced from face 24 of projection 14 and shelf face 36 is slightly spaced from pipe bell wall 25. Shelf face 36 must extend far enough to abut on surface 25 when face 26 abuts face 24.

A weldment 8 is a bead welded around the circumference in a plane inwardly of the end of plain pipe 2. Weldment 8 is located in a plane which is determined by the relative positions and dimensions of projection 14 and locking segment 10. Weldment 8 may also be a bar welded to the plain end of pipe 2.

In order to assemble the joint between pipes 2 and 4 the gasket 6 is first inserted into its designed groove in the bell end of pipe 4. Plain pipe 2 is pushed into the bell end of pipe 4 until its outer end is pushed beyond gasket 6 to form a fluid-tight seal. The outer diameter of weldment 8 is smaller than the open diameter of projection 14 so that weldment 8 clears projection 14 when pipe 2 is inserted into pipe 4. Locking segments 10 are inserted into groove 16 by putting them through recess 12 in projection 14 of the bell of pipe 4 and then rotating them so that they form a ring around the outer surface of plain pipe 2. Weldment 8 acts as a stop to keep locking segments 10 in groove 16.

As the fluid pressure increases the pipe 2 and 4 may tend to disengage because the axial load tends to separate the two pipes but locking segments 10 will abut against weldment 8 and surface 18 of projection 14 will engage surface 20 of locking segment 10. The two surfaces 18 and 20 will fit tightly together in a wedging action as the pressure of the fluid in its pipe increases. This action continues in accordance with the teachings of U.S. Pat. No. 3,684,320.

As the fluid pressure increases further, the joint, if not otherwise protected, may rupture by the bursting of plain pipe 2 under the inward radial force of locking segment 10 or by bursting of the bell of pipe 4 under the equal and opposite outward radial force of locking segment 10.

Friction between the outside surface of pipe 2 and surface 22 of locking segment 10 may be so great that a large portion of the axial load is resisted by friction and the remainder by the shear load placed upon weldment 8. However, when the axial load becomes large enough, the bell opening of pipe 4 will expand elastically and the pipe will move apart enough to permit bell surface 24 to contact locking segment surface 26, thus transmitting any further load into weldment 8. Should this transmission of load into the weldment by surface tend to rotate locking segment 10 then shelf face 26 of locking segment 10 will abut bell surface 25 stopping such rotation.

Laboratory tests have shown that the preferred embodiment of the invention can resist an axial load that would otherwise either split the bell of pipe 4 or crush the plain end of pipe 2. It is thus important that bell groove 16 be wide enough to contain body portion 13 and to allow axial movement of the pipe after surface 18 contacts surface 20.

The present embodiments of this invention are illustrative and should not be considered as restrictive, the scope of the invention being indicated by the appended claims.

We claim:

1. An improved pipe connection including in combination a first pipe in locking, overlapping engagement with a second pipe and means to lock the two pipes together, said means comprising:
   a. said first pipe having a bell portion, said bell portion having a radially inwardly, circumferentially extending projection integrally mounted to said bell portion at one end of said first pipe, said projection forming one end of a circumferential groove, said projection having a first surface remote from said bell portion facing toward the interior of said first pipe and forming a first contacting surface, said projection further having a second contacting surface connected to said first surface and extending radially of said bell portion to form one wall of said elongated circumferential groove, said projection having an arcuate, circumferentially shaped recess, said recess providing an opening into a portion of said elongated circumferential groove,
   b. a plurality of arcuate shaped locking segments corresponding in shape to said arcuate shaped recess in said projection and conforming to the outer circumference of said second pipe, each of said segments having a leg portion and a body portion; said leg portion having a contacting surface, and said body portion having a contacting surface,
   c. said second pipe having a plain end and a circumferential weldment protruding from its outside surface near said plain end,
   d. said locking segments being installed through said recess and into slidable engagement with the outside surface of said plain end of said second pipe between said weldment and said projection, and thereafter moved out of alignment with said recess, after said contacting surface of said leg portions abut with said first contact surface of said projection,
   e. said body portion of said locking segments extending into said elongated circumferential groove in the bell portion of said first pipe, and f. the improvement which comprises a radial protrusion integral with said body portion of each of said locking segments, said radial protrusion extending axially away from said leg portion, said radial protrusion further having an upper shelf face portion, and said bell portion of said first pipe having a circumferential wall inwardly adjacent said circumferential groove whereby said contacting surface of said leg portion of each of said locking segments abuts with said first contacting surface of said projection and said contacting surface of said body portion of each of said locking elements is adapted to abut with said second contacting surface of said projection and said upper shelf face portion of said protrusion is adapted to abut said circumferential wall of said bell portion of said first pipe to limit the amount of rotation of the locking segments relative to said bell portion.

2. The combination of claim 1 in which said locking element has an arcuate portion adapted to contact said weldment and a lower face of said protrusion forms an extension of said arcuate portion.

3. The combination of claim 1 in which said shelf surface is located about midway of said integrally connected face of said locking element.

4. An arcuate locking segment, adapted for locking two pipes in telescoping engagement, one of said pipes having a substantially longitudinal portion extending a predetermined distance away from one end of said pipe, said longitudinal portion having a uniform circumference of predetermined diameter, comprising:

a body having a length less than the length of said circumference, said body having a top wall and a bottom wall, said bottom wall being arcuate in shape corresponding to the shape of said uniform circumference.

said body having a front and a rear wall, said front wall being perpendicular to said bottom wall and terminating along one edge of said bottom wall and along one edge of said top wall, said top wall extending toward said rear wall at an upwardly inclining angle, said top wall further having an integral upwardly extending protrusion, said protrusion having a flat top wall and front and back vertical side walls, said back vertical wall having a protrusion integral therewith and extending outwardly away from said rear vertical wall, said protrusion having an arcuate top shelf and a vertical end wall, said end wall being connected to said bottom wall by a wall which is arcuate in both a longitudinal and circumferential direction.

5. A locking segment as recited in claim 4 in which said flat top shelf on said protrusion is located about midway between said top wall of said protrusion and said arcuate wall.

* * * * *